United States Patent [19]

Meijer

[11] 3,943,331

[45] Mar. 9, 1976

[54] TEMPERATURE CONTROL CIRCUIT
[75] Inventor: Robert S. Meijer, Montreal, Canada
[73] Assignee: Multi-State Devices, Ltd., Dorval, Canada
[22] Filed: Dec. 6, 1974
[21] Appl. No.: 530,388

[52] U.S. Cl. .............. 219/499; 219/494; 219/497; 219/501
[51] Int. Cl.² .......................................... H05B 1/02
[58] Field of Search .......... 219/494, 497, 499, 501, 219/505, 504, 490; 323/22; 312/33

[56] References Cited
UNITED STATES PATENTS
3,553,429 1/1971 Nelson ............................. 219/499
3,678,247 7/1972 Sawa et al. ....................... 219/501
3,854,033 12/1974 Edge ................................ 219/497

Primary Examiner—R. N. Envall, Jr.
Assistant Examiner—Fred E. Bell
Attorney, Agent, or Firm—Spencer & Kaye

[57] ABSTRACT

A temperature control circuit is disclosed for controlling the firing angle of a thyristor such as a silicon controlled rectifier connected in series with a heater across an alternating power source. The control circuit comprises a field effect transistor having its source and drain electrodes connected for firing of the rectifier when the field effect transistor is rendered conductive, and a bias phase control connected to the gate of the field effect transistor for generating a fixed A.C. voltage component which is phase shifted by about 90° with respect to the voltage of the power source together with a temperature dependent D.C. voltage component to control the firing angle of the silicon controlled rectifier in accordance with the heat generated by the heater, the sum of the A.C. and D.C. voltage components being fed to the gate of the field effect transistor. The temperature dependent D.C. voltage is generated by a circuit comprising a parallel arrangement including an adjustable resistor connected in series with a first diode and a temperature sensitive resistor connected in series with an oppositely poled second diode, each of such diodes being poled so as to produce a more negative D.C. voltage component with increasing temperature and vice-versa.

5 Claims, 2 Drawing Figures

U.S. Patent  March 9, 1976  3,943,331
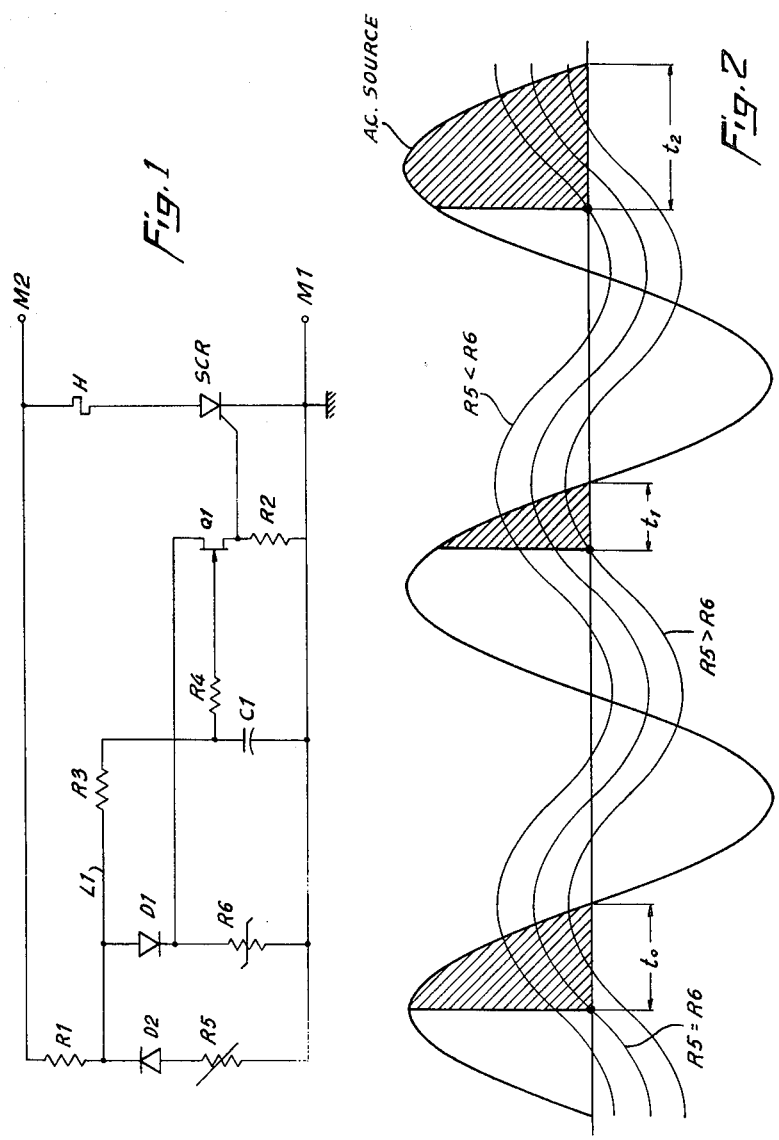

TEMPERATURE CONTROL CIRCUIT

This invention relates to a temperature control circuit for controlling the heat generated by a heater connected in series with a thyristor.

It is well known to control the temperature of a heater by controlling the conduction angle of a thyristor connected in series with the heater. Such control is normally done by varying the firing angle of the thyristor. On a closed loop control system, the firing angle is regulated automatically in response to an error signal derived from a temperature sensor. However, the known circuits used for effecting such control are complex, expensive and unreliable and, as such, are not well suited for installation in small domestic appliances, for example curling irons.

It is therefore the object of the present invention to provide a novel closed loop temperature control circuit for regulating the firing angle of a thyristor which offers considerable simplification over the previous techniques and which, by virtue of the small number of components used, is less expensive and offers a significant increase in circuit reliability.

The temperature control circuit, in accordance with the invention comprises a field effect transistor having its main source and drain electrodes connected for firing of the thyristor when the field effect transistor is rendered conductive, and a bias phase control circuit connected to the gate of the field effect transistor for generating a fixed A.C. voltage component which is phase shifted with respect to the voltage of the power source and a temperature dependent D.C. voltage to control the firing angle of the thyristor in accordance with the heat generated by the heater, the sum of the A.C. and D.C. voltage components being fed to the gate of the field effect transistor. The D.C. voltage component is generated by a circuit comprising a parallel arrangement including an adjustable resistor connected in series with a first diode and a temperature sensitive resistor connected in series with an oppositely poled second diode, and each of such diodes being poled so as to produce a more negative D.C. voltage component with increasing temperature and vice-versa.

The A.C. voltage component which is superimposed on the above D.C. component circuit may be generated by a circuit including a resistor connected in series with a capacitor across the power source, such capacitor being connected to the gate of the field effect transistor.

The field effect transistor is preferably connected to the cathode of the above-mentioned second diode for feeding a half wave voltage waveform to the field effect transistor for controlling the half wave current waveform passing through the thyristor.

The temperature sensitive resistor located in the circuit for generating the D.C. voltage component may have a negative coefficient of temperature in which case the first diode is poled so as to conduct during the negative cycle of the power source whereas the second diode is poled to conduct during the positive cycle of the power source.

The temperature sensitive resistor may also have a positive coefficient of temperature and, in this case, the first diode is poled so as to conduct during the positive cycle of the power source whereas the second diode is poled to conduct during the negative cycle of the power source.

The invention will now be disclosed, by way of example, with reference to the accompanying drawings in which:

FIG. 1 illustrates a preferred embodiment of a temperature control circuit; and

FIG. 2 illustrates the waveform appearing on the gate of the field effect transistor for controlling conduction thereof.

Referring to FIG. 1, there is shown a preferred embodiment of the temperature control circuit in accordance with the invention. Such circuit is for controlling the heat generated by a heater H connected in series with the main electrodes of a silicon controlled rectifier SCR across terminals M1 and M2 adapted for connection to an alternating power source which may be a conventional power line. Terminal M1 is arbitrarily taken as the ground point.

The controlled rectifier SCR is triggered by a field effect transistor Q1 connected to terminals M1 and M2 through resistors R1 and R2 and diode D1. Resistor R1 is a voltage dropping resistor. Resistor R2 has one terminal connected to the gate of the controlled rectifier and its other terminal connected to the cathode electrode of the rectifier and has a resistance value such as to set the proper voltage for firing the rectifier.

The firing angle of the controlled rectifier is regulated by a so-called bias phase control circuit involving the combination of A.C. and D.C. voltages applied to the gate of the field effect transistor Q1. The A.C. voltage component is generated by a fixed phase circuit including a resistor R3 and a capacitor C1 which are connected across the terminals M1 and M2 through resistor R1. The connecting point of resistor R3 and capacitor C1 is connected to the gate of the field effect transistor Q1 through coupling resistor R4. The values of resistor R3 and capacitor C1 are selected so as to shift the phase of the sinusoidal voltage appearing across the capacitor C1 by a predetermined angle, preferably about 90°, with respect to the voltage applied across terminals M1 and M2. The D.C. voltage component is generated by a parallel arrangement, in accordance with the main feature of the present invention, which includes a variable resistor R5 connected in series with a diode D2 and a temperature sensitive resistor R6 connected in series with diode D1. Diodes D1 and D2 are oppositely poled whereas resistor R6 is, in the embodiment disclosed, a negative temperature coefficient device which may be thermally coupled with the heater or otherwise adapted to sense the heat generated by the heater. The above arrangement is connected in parallel with the previously described resistor R3 and capacitor C1.

The above temperature control circuit operates as follows:

The above disclosed parallel arrangement including variable resistor R5 in series with diode D2 and temperature sensitive resistor R6 in series with diode D1 provide the basic temperature discrimination function. During the positive half cycles of the alternating voltage applied across the terminals M1 and M2, the voltage appearing on line L1 neglecting the effect of field effect transistor Q1, is determined primarily by the impedance of resistor R6 due to the blocking effect of diode D2. During the negative half cycles, the voltage seen on line L1 is determined by the impedance of variable resistor R5 due to the blocking effect of diode D1. Hence, over the full line cycle, the voltage seen on L1 is a sinusoidal voltage consisting of a positive half cycle followed by a negative half cycle and the respective amplitudes of these half cycle voltages are dependent upon the relative impedances of resistors R5 and R6. The voltage seen on L1 is thus a sinusoidal voltage with a D.C. component which is nul when the impedance of resistor R5 is equal to the one of temperature sensitive resistor R6 but which is positive when the impedance of temperature sensitive resistor R6 is higher than the one of resistor R5 or negative when the impedance of temperature sensitive resistor R6 is lower than the one of resistor R5. Therefore, if the temperature sensed by such resistor R6 increases, a negative D.C. component is generated. On the other hand, if the temperature drops, a positive D.C. component is generated. Of course, the same effect could be obtained by interchanging resistors R5 and R6 and using a positive temperature coefficient resistor. In all events, the polarity of the diodes D1 and D2 must be such that increasing temperature always results in a more negative D.C. component while decreasing the temperature results in a more positive D.C. component as it will be seen in the following part of the description.

The D.C. component appearing on line L1 appears on capacitor C1. Such D.C. component is superimposed on the phase shifted A.C. component appearing across capacitor C1. As illustrated in FIG. 2, the voltage on the capacitor crosses zero at a point depending upon the D.C. component on line L1. This D.C. component is derived from the relative value of resistor R5 to temperature sensitive resistor R6 as explained previously and hence on the temperature sensed by temperature sensitive resistor R6. The desired temperature is set by adjusting the value of variable resistor R5 to a desired value. If the temperature generated by heater H is equal to the one set by variable resistor R5 (R5=R6) the conduction period of the field effect transistor and of the controlled rectifier will be $t_0$ as illustrated in FIG. 2. On the other hand, if the temperature generated by heater H is higher than the one set by variable resistor R5, then the impedance value of resistor R6 will be lower than the one set by resistor R5 and the voltage on C1 will be as indicated by the curve R5>R6. The conduction period of the field effect transistor and of the controlled rectifier will be reduced to $t_1$. Finally, if the temperature sensed by temperature sensitive resistor R6 is lower than the value set by resistor R5, the impedance of temperature sensitive resistor R6 will be greater than the one set by resistor R5 and the voltage on C1 will be as indicated by the curve R5<R6. The conduction period of the field effect transistor and of the controlled rectifier will then be increased to $t_2$. It will therefore be seen that the net of the above disclosed temperature control circuit is that the conduction period of the field effect transistor and, consequently, of the controlled rectifier connected thereto varies directly with the power required by the heater to maintain the temperature sensitive resistor R6 at the point set by variable resistor R5. If the sensor perceives a small amount of overheat the D.C. level on the capacitor C1 will decrease and the conduction period of the controlled rectifier will be lowered and the heater will generate less heat. On the other hand, if the sensor perceives a small amount of cooling, the D.C. level on the capacitor C1 will increase and the conduction period of the controlled rectifier will be increased and the heater will generate more heat. As mentioned previously, it is therefore important that, when a temperature sensitive resistor R6 having a negative coefficient temperature is used in series with diode D1, diode D1 be poled to conduct during the positive half cycles of the D.C. voltage and that diode D2 which is connected in series with variable resistor R5, be poled to conduct during the negative half cycles of the source. On the other hand, when a temperature sensitive device having a positive temperature coefficient is used in series with diode D2 and the variable resistor connected in series with diode D1, it is important that diode D2 be poled to conduct during the negative cycles of the source and diode D1 be poled to conduct during the positive cycles of the source.

The above disclosed circuit, apart from offering considerable simplification by virtue of the small number of components, also offers a significant increase in circuit reliability not only because of the lower number of components but also because of the following several features which are intrinsic to the circuit configuration itself:

1. Line voltage rejection

The inherently symmetrical nature of the parallel arrangement including resistor R5 in series with diode D2 and resistor R6 in series with diode D1 reduces line voltage variations to a second order effect, i.e. the set point changes negligably as the supply voltage across terminals M1 and M2 undergoes normal variation.

2. Field effect transistor gate protection

Because of resistor R3 and capacitor C1, the gate of the field effect transistor Q1 is entirely protected against typical high voltage-short duration spikes on the power source.

3. Field effect transistor drain protection

The maximum voltage on the source of field effect transistor Q1 is limited by virtue of the fact that increasing voltage on temperature sensitive resistor R6 results in a more positive D.C. component on capacitor C1, tending to turn field effect transistor Q1 on a greater percentage of the time which, in turn, reduces the voltage on temperature sensitive resistor R6.

4. Temperature sensitive device protection

When using a temperature sensitive resistor R6 having a negative temperature coefficient, such resistor is automatically protected because an increasing voltage on the temperature sensitive resistor R6 will result in a more positive D.C. component on capacitor C1, tending to turn field effect transistor Q1 on a greater percentage of the time thus reducing the voltage on temperature sensitive resistor R6.

5. Firing point definition

The firing point definition is augmented by the intrinsic square law transfer characteristic of the field effect transistor Q1.

6. High gate impedance of field effect transistor Q1.

The high gate impedance of the field effect transistor Q1 assures minimum loading on the capacitor C1 insuring proper phase shift of the A.C. voltage component and the integrity of the D.C. voltage component.

The above disclosed temperature control circuit operates satisfactorily with any temperature sensitive resistor but the use of a temperature sensitive resistor having a characteristic such as disclosed in U.S. application Ser. No. 467,594 filed May 6, 1974 by the same assignee as the present application, has given particularly good results because such temperature sensitive resistor exhibits a sharp break in its impedance-temperature characteristic so as to provide a narrow proportional band. In addition, such resistor may have a certain amount of hysteresis which reduces the rate of variation in the resistance of the temperature sensitive device within the transition range and so increases its stability as more clearly disclosed in the above-mentioned patent application.

Although the invention has been disclosed with reference to a preferred embodiment thereof, it is to be understood that various modifications may be made within scope of the following claims. For example, the field effect transistor Q1 does not necessarily have to be connected to the cathode of diode D1. It could be connected directly across the power source in series with a suitable voltage dropping resistor. The connection illustrated in the preferred embodiment of the invention, apart from cutting down the number of components, provides a drain protection of the field effect transistor against voltage variations as explained previously. It will also be understood that variable resistor R5 may be connected in series with diode D1 and temperature sensitive resistor R6 connected in series with diode D2 provided that the temperature sensitive resistor R6 has a positive temperature coefficient so as to produce a more negative D.C. voltage component with increasing temperature and vice-versa. Finally, the invention is not limited to the control of silicon controlled rectifiers but may be used to control any types of thyristors.

I claim:

1. A temperature control circuit for controlling the firing angle of a thyristor connected in series with a heater across an alternating power source, comprising:
   a. a field effect transistor having its source and drain electrodes connected for firing of the thyristor when said field effect transistor is rendered conductive; and
   b. a bias phase control circuit connected to the gate of said field effect transistor and including means for generating a fixed A.C. voltage component which is phase shifted with respect to the voltage of said power source and means for generating a temperature dependent D.C. voltage to control the firing angle of said thyristor in accordance with the heat generated by said heater, the sum of said A.C. and D.C. voltage components being fed to the gate of such field effect transistor, said means for generating said temperature dependent D.C. voltage component comprising a parallel arrangement including an adjustable resistor connected in series with a first diode and a temperature sensitive resistor connected in series with an oppositely poled second diode, each of said diodes being poled so as to produce a more negative D.C. voltage component with increasing temperature and vice-versa.

2. A temperature control circuit as defined in claim 1, wherein said means for generating said phase shifted A.C. voltage component includes a resistor connected in series with a capacitor, said capacitor being connected to the gate of said field effect transistor.

3. A temperature control circuit as defined in claim 1, wherein said field effect transistor is connected to the cathode of said second diode for feeding a half-wave voltage waveform to the field effect transistor for controlling the half-wave current waveform passing through the thyristor.

4. A temperature control circuit as defined in claim 1, wherein said first diode is poled so as to conduct during the negative half cycles of said power source whereas second diode is poled to conduct during the positive cycles of said power source, and whereas said temperature sensitive resistor has a negative coefficient of temperature.

5. A temperature control circuit as defined in claim 1, wherein said first diode is poled so as to conduct during the positive cycles of said power source whereas said second diode is poled to conduct during the negative cycles of said power source and whereas the temperature sensitive resistor has a positive coefficient of temperature.

* * * * *